(12) United States Patent
Nyce (10) Patent No.: US 7,258,005 B2
(45) Date of Patent: Aug. 21, 2007

(54) ISOLATED CAPACITIVE FLUID LEVEL SENSOR

(76) Inventor: David Scott Nyce, 2633 Whistling Quail Run, Apex, NC (US) 27502

( * ) Notice: Subject to any disclaimer, the term of this patent is extended or adjusted under 35 U.S.C. 154(b) by 0 days.

(21) Appl. No.: 10/773,674

(22) Filed: Feb. 6, 2004

(65) Prior Publication Data

US 2005/0172712 A1 Aug. 11, 2005

(51) Int. Cl.
*G01F 23/26* (2006.01)
(52) U.S. Cl. .................................... 73/304 C
(58) Field of Classification Search .............. 73/304 C; 340/620
See application file for complete search history.

(56) References Cited

U.S. PATENT DOCUMENTS

| | | | | |
|---|---|---|---|---|
| 4,201,085 A | * | 5/1980 | Larson | 73/304 C |
| 4,603,581 A | * | 8/1986 | Yamanoue et al. | 73/304 C |
| 5,005,407 A | * | 4/1991 | Koon | 73/290 R |
| 5,227,174 A | * | 7/1993 | Konig | 425/147 |
| 6,490,920 B1 | * | 12/2002 | Netzer | 73/304 C |

\* cited by examiner

*Primary Examiner*—Hezron Williams
*Assistant Examiner*—Paul M. West (57) ABSTRACT

A capacitive fluid level sensor is disclosed that operates without the use of a float, wherein coplanar sensing electrodes disposed onto a dielectric substrate and positioned proximate a dielectric wall of a vessel containing a fluid, form a fringing field capacitance that changes in accordance with changes in the level of the fluid. The electrodes are electrically insulated from the measured fluid. The electrodes are sized and spaced to maximize response of the capacitance to changes in the level of the fluid, while minimizing the effects of the dielectric wall. The sensor is fabricated such that it can be positioned against the outside of a dielectric wall of a vessel, or embedded within a dielectric material. A low permitivity spacer and shield assembly are taught which reduces sensitivity to electric fields external to the vessel. An interdigital comb configuration of the electrodes is also disclosed in which depressions or gaps are formed into the dielectric substrate in an area of spacing of the electrodes.

8 Claims, 9 Drawing Sheets

View from back     View from front     View from edge
(this side faces toward vessel)

ISOLATED CAPACITIVE FLUID LEVEL SENSOR

BACKGROUND OF THE INVENTION

1. Field of the Invention

The present invention relates to sensors for measurement of fluid level. The measured fluid may be contained in a sump, reservoir, process vessel, holding tank, or other man made or natural fluid container. A fluid container is herein called the vessel. An example of such a vessel is a holding tank for a marine use. At least a part of at least one vessel wall is fabricated from an electrically non-conductive material. The terms electrically non-conductive, insulating, and dielectric are used here interchangeably.

More particularly, the present invention relates to a capacitive level sensor that measures fluid level in the vessel without the use of a float, and functions based on the permitivity of the measured fluid being substantially different from that of air, the sensing element of the capacitance level sensor being electrically insulated from the measured fluid.

The capacitive level sensor of the present invention measures fluid level while the sensing element is mounted on, or embedded within, an outside wall of the vessel. Alternatively, the present invention also teaches the embedding of the sensing element into a wall of a device that utilizes fluid level information, such as a bilge pump.

2. Description of the Prior Art

Prior art capacitive level sensors have been built which depend on the permitivity of a measured fluid. U.S. Pat. No. 4,924,702 teaches a capacitive level sensor that is inserted into a reservoir containing a liquid. Conversely, the present invention teaches the design of a sensor that is not immersed into the measured fluid, but is instead mounted on the outside of a wall of a vessel that contains the measured fluid. The separation of the sensor electrodes from the sensed fluid in the present invention allows the sensor to operate corrosion-free while measuring a corrosive fluid, such as seawater. Even when an immersed sensor is anodized as taught in the prior art (U.S. Pat. No. 6,564,658), or otherwise coated with a compatible material, corrosion and electrical conductivity can remain a problem due to inconsistency or pinholes in the coating due to deterioration of the coating with age and use. The present invention also allows for easy addition of a level sensor to an already-installed vessel. An alternative embodiment of the present invention teaches embedding the sensing element within the vessel wall. Still another embodiment of the present invention teaches embedding the sensing element into an electrically non-conductive member of another device that utilizes fluid level information, such as a bilge pump, located within the vessel. In all embodiments of the present invention, direct contact of the sensing element with the measured fluid is avoided.

U.S. Pat. No. 6,164,132 teaches a capacitive liquid level indicator that incorporates dual capacitive sensor arrays, disposed on opposite sides of a dielectric substrate. In order to expose the two sides of the sensor array assembly to the measured liquid, the complete sensor array assembly is immersed into the measured liquid, contrary to the present invention.

U.S. Pat. No. 4,142,415 teaches a device for continuously measuring the liquid level in a container, wherein a capacitive sensor is disposed in the liquid. This is also contrary to the present invention, as the present invention teaches the separation of the sensing element from the measured fluid by a dielectric material.

U.S. Pat. Nos. 6,293,142 and 6,564,658 teach electromagnetic sensors that use special "slow wave structure" electrode configurations, called electrodynamic elements, that, when driven by a radio frequency generator, produce a "slowed wave". The wave is slowed due to the electromagnetic cooperation (related to the travel time of the electromagnetic wave between adjacent conductors of the electrodynamic element) among adjacent conductors arranged in series with spacing. The ratio by which the wave is slowed, on comparison to the natural speed of an electromagnetic wave in the materials used, is called the "slowing factor". This measurement technique is, according to column 2, line 67 of U.S. Pat. No. 6,564,658 and column 2, line 60 of U.S. Pat. No. 6,293,142, " . . . contrary to the capacitance and inductance sensitive elements".

The present invention utilizes a capacitance sensitive element, herein called the sensing element. The present invention does not use a slowed wave related to the propagation time between adjacent conductors, but relies instead on the positioning of electrode conductors with respect to one another and optionally, also with respect to a guard or shield conductor, in order to provide control of the shape and size of the sensing field of a capacitive sensor. In the present invention, the field size is made large enough to penetrate a dielectric wall of the vessel, or a dielectric wall of a device that utilizes fluid level information, in order to measure the level of fluid within the vessel.

BRIEF SUMMARY OF THE INVENTION

Both the prior art level sensors and the present invention provide for the measurement of the level of a fluid contained within a vessel, without using a float. It is an object of the present invention, in contrast to prior art fluid level sensors, to provide a novel method for measuring fluid level in a vessel with an isolated sensing element, the vessel having at least a portion of at least one wall made of a dielectric material. The novel method avoids the problems associated with immersion of a sensing element into the measured fluid or the complexity of producing a slowed electromagnetic wave. The present invention provides long-term reliability due to the absence of contact with the measured fluid. In the case where the measured fluid is corrosive, the vessel would normally be constructed of a compatible material according to standard practice in the art. The vessel wall can therefore provide reliable separation of the sensing element from a corrosive measured fluid contained within the vessel. In the case of an electrically conductive measured fluid, this same construction prevents measurement errors that may be due to conduction between the sensing element conductors and through the measured fluid, since the present invention teaches the use of a dielectric wall separating the sensor from the conductive fluid. A sensor made according to a first embodiment of the present invention can be easily added to a vessel that is already mounted in place. This is accomplished by mounting the sensing element onto the outside of a dielectric wall of the vessel. Alternatively, the sensing element may be embedded within a dielectric wall of the vessel. A sensor made according to a second embodiment of the present invention can be fabricated at exceptionally low cost by embedding the sensing element into the vessel wall. A sensor made according to a third embodiment of the present invention improves the reliability of a device that utilizes fluid level information, such as a bilge pump, by replacing the traditional float switch with a floatless capacitive sensor that is embedded into a dielectric wall of the device.

The sensitivity of a sensing element according to the present invention is sufficient to provide accurate fluid level measurement at a low cost. The sensing element and electronic circuit module of the present invention can be designed and implemented more simply than those of the slowed-wave type of sensor due to the lower operating frequency of the present invention. The operating frequency of the present invention can be much lower than that of the slowed-wave type of sensor for measuring a given type of fluid, since travel-time-based cooperation of the fields between adjacent element electrodes is not required.

When measuring conductive fluids, such as seawater, according to the present invention, a ground electrode is sometimes used to provide connection between the conductive fluid and the electronic circuit module. This improves the stability of the signal from the electronic circuit module in cases where the conductive fluid may be intermittently grounded through other means.

A conductive plane element, or other conductor shape, is sometimes installed near the sensing element on the side opposite to that of the measured fluid. This conductor is called a ground plane, shield, or guard. This conductor is electrically connected to ground or to the electronic circuit module, and serves to reduce sensitivity of the sensing element to unwanted external influence by electric and/or electromagnetic fields.

BRIEF DESCRIPTION OF THE DRAWINGS

FIG. 10 also indicates an area 23, within which a fluid level sensing element is embedded according to the present invention.

DETAILED DESCRIPTION OF THE INVENTION

Figure 1:
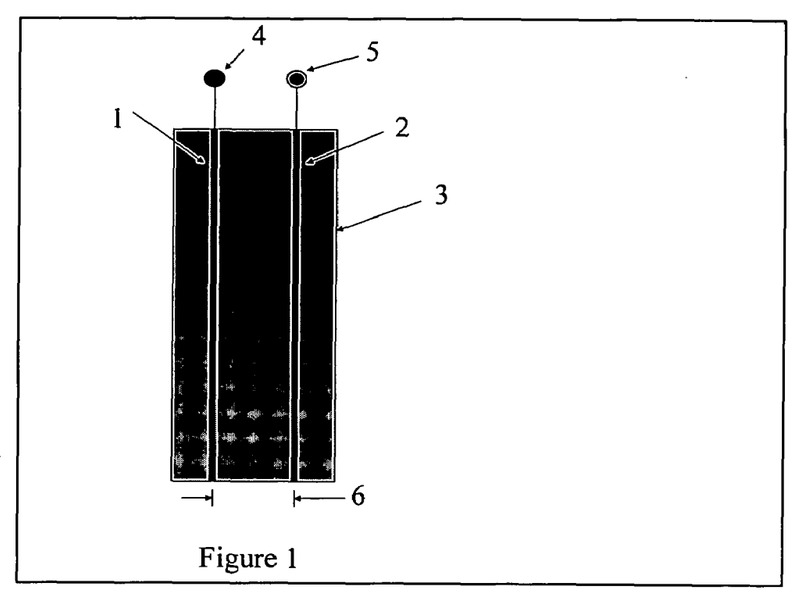
FIG. 1 shows a fluid level sensing element comprising a pair of electrical conductors 1 and 2, attached to a dielectric substrate 3, and forming a capacitance that can be measured between connections 4 and 5. The conductors are separated by spacing 6.
Figure 2:
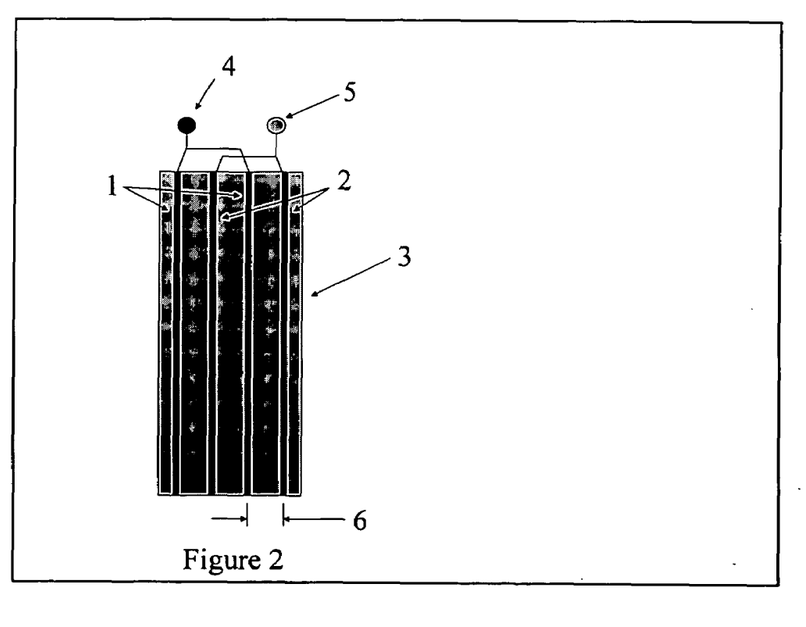
FIG. 2 shows a way to connect multiple sets of conductors or conductor patterns. Conductors 1 and 2 in this case are each sets of more than one conductor connected in parallel, with spacing 6.
Figure 3:
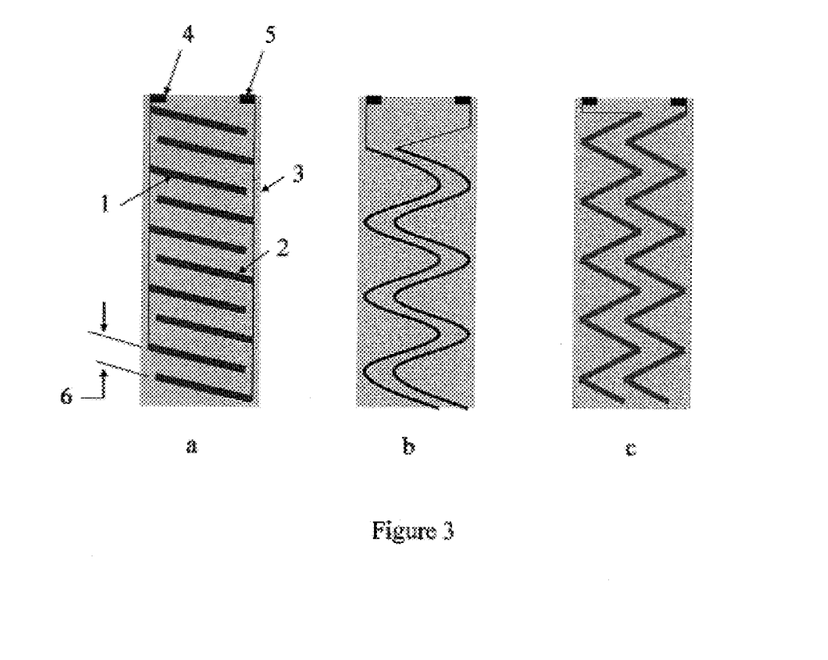
FIG. 3a shows a fluid level sensing element having an interdigital comb pattern configuration of conductors 1 and 2 attached to dielectric substrate 3, with connections 4 and 5, and separated by spacing 6.
FIG. 3b shows the arrangement of conductors for a sine or meander pattern.
FIG. 3c shows the arrangement of conductors for a zigzag pattern.
Figure 4:
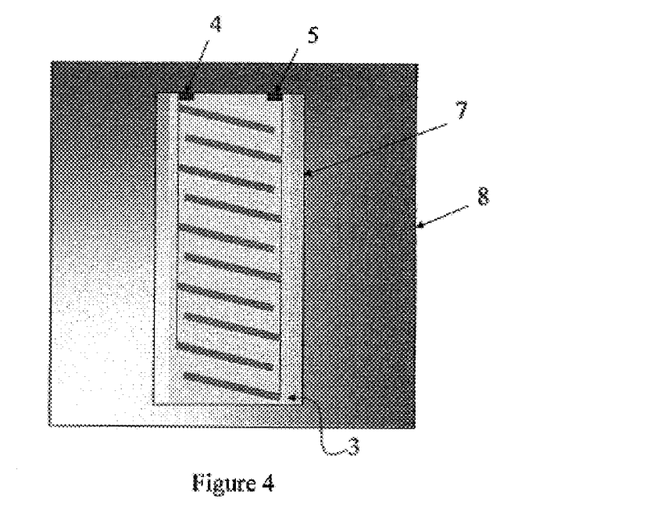
FIG. 4 shows the sensing element of FIG. 3a, with an adhesive-backed tape 7 attached to the back surface of the sensing element, thereby mounting it to dielectric wall 8, of a vessel.
Figure 6:
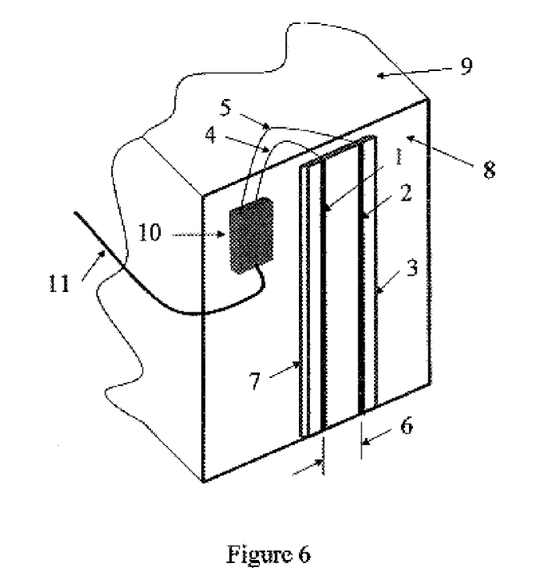
FIG. 6 shows the sensing element of FIG. 1, mounted with adhesive-backed tape 7, to wall 8, of vessel 9. Electronics module 10 is electrically attached to conductors 1 and 2, via connections 4, 5. Electronics module 10, receives power and sends out a fluid level signal through electrical cable 11.

A first preferred embodiment of the present invention enables the measurement of fluid level when the fluid is contained within a vessel that has at least one wall made of a dielectric material. An application of a fluid level sensor of the first preferred embodiment is shown in FIG. 6, and described more fully in a subsequent paragraph. Vessel 9 may be a marine holding tank, designed to hold waste water until an appropriate time for discharge. Level information is helpful in order to discharge the waste water at an appropriate time and location. Configuration of a capacitive sensing element according to the present invention provides the advantage of separation of the sensing element from a corrosive waste fluid. A sensing element is used that can take any of several forms, depending on the requirements of the application. A version of a sensing element of the first preferred embodiment is shown in FIG. 1. A set of electrically conductive electrodes 1 and 2, comprise the sensing element and are mounted to a dielectric substrate material 3. The dielectric substrate material may be flexible, and may be adhesive-backed. This sensor assembly may be mounted, as shown in FIG. 4, to a dielectric wall 8, of vessel 9, by adhesive 7, or other fastening means. The first preferred embodiment may utilize single conductor electrodes, as shown in FIG. 1, or multiple electrodes as shown in FIG. 2 with interconnections among like electrodes of conductors 1 and 2, or electrode shapes as shown in FIG. 3. The patterns of 3a, an interdigital comb, 3b, a sine pattern, and 3c, a zigzag, serve to increase the level of capacitance for a given sensing element area. Meander lines and other patterns that provide for an increased capacitance may also be used.

Prior Art capacitive fluid level sensors that sense a fluid through the thickness of a dielectric material, obtain their ability to do so through minimizing the thickness of the dielectric material, or through the use of additional conductors placed between adjacent conductors of the sensing element. Contrary to capacitive sensors of Prior Art, the present invention obtains this ability through the spacing of the conductors and the ratio of the spacing to the average width of the individual conductors. These spacing and widths are defined with respect to the thickness of the dielectric wall between the sensing conductors and the fluid.

Figure 5:
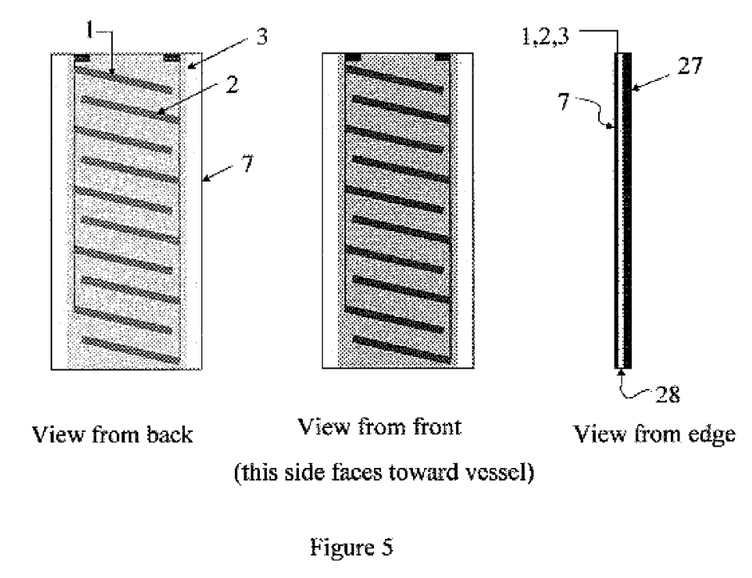
FIG. 5 is a detail of the sensing element of FIG. 3, together with the adhesive-back tape 7 attached to its back surface, which was shown if FIG. 4. On the edge view to the right in FIG. 5, a spacer, 28, is attached to the front of the sensing element, and a shield, 27, is attached to the spacer.

When a sensing element is attached to a dielectric wall as shown in FIG. 4, the sensing element may use an adhesive-backed tape to enable the attachment. FIG. 5 shows three views of such a construction. The view from the back is looking through a semi-transparent adhesive-backed tape. The tape provides the sticky surface that would attach to a dielectric wall. The view from the front is the view one could observe after the sensing element is mounted, but before adding a spacer and shield. The view from the edge shows the conductors, 1, 2, the dielectric substrate to which the conductors are mounted, 3, and the adhesive-backed tape, 7, a spacer, 28, and shield, 27. The spacer is formed of a low permitivity material such as a formed plastic. The shield is formed of an electrically conductive material, such as a thin brass sheet. Alternatively, the sensing element may be embedded within a dielectric wall of the vessel, so that spacer 28 is formed of a part of the dielectric wall.

When the first preferred embodiment is implemented by mounting the sensing element to the outside of a dielectric wall of a holding tank, the assembly is as shown in FIG. 6. The sensing element comprises conductors 1 and 2, and dielectric substrate 3. They are attached to dielectric wall 8 by the adhesive-backed tape 7. Electronics module 10 is connected to electrodes 1, 2 by connections 4, 5. Cable 11 carries power and signal to and from electronics module 10. In this case, vessel 9, is a holding tank with at least one wall, 8, made of a dielectric material.

Figure 7:
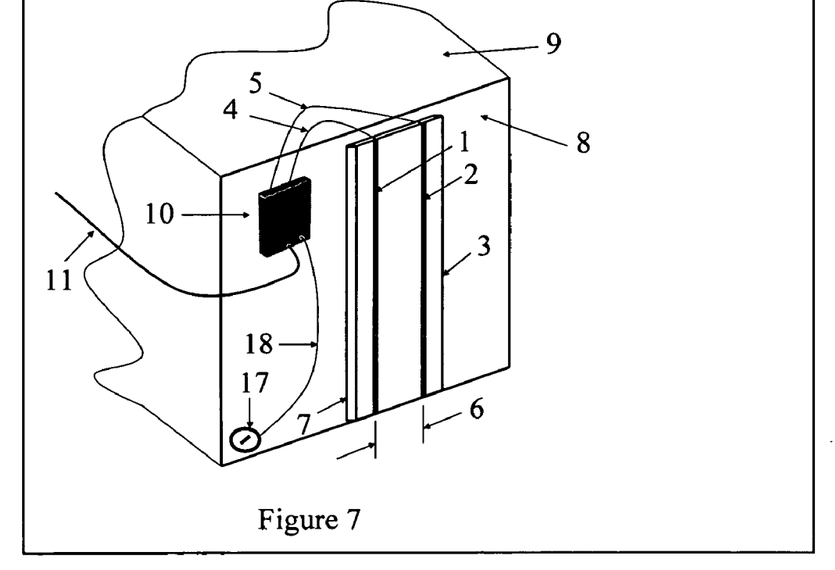
FIG. 7 is the sensor and electronics module of FIG. 6, with the addition of electrode 17, extending electrical connection into the measured fluid within vessel 9. Conductor 18, connects electrode 17 to electronics module 10.
Figure 13:
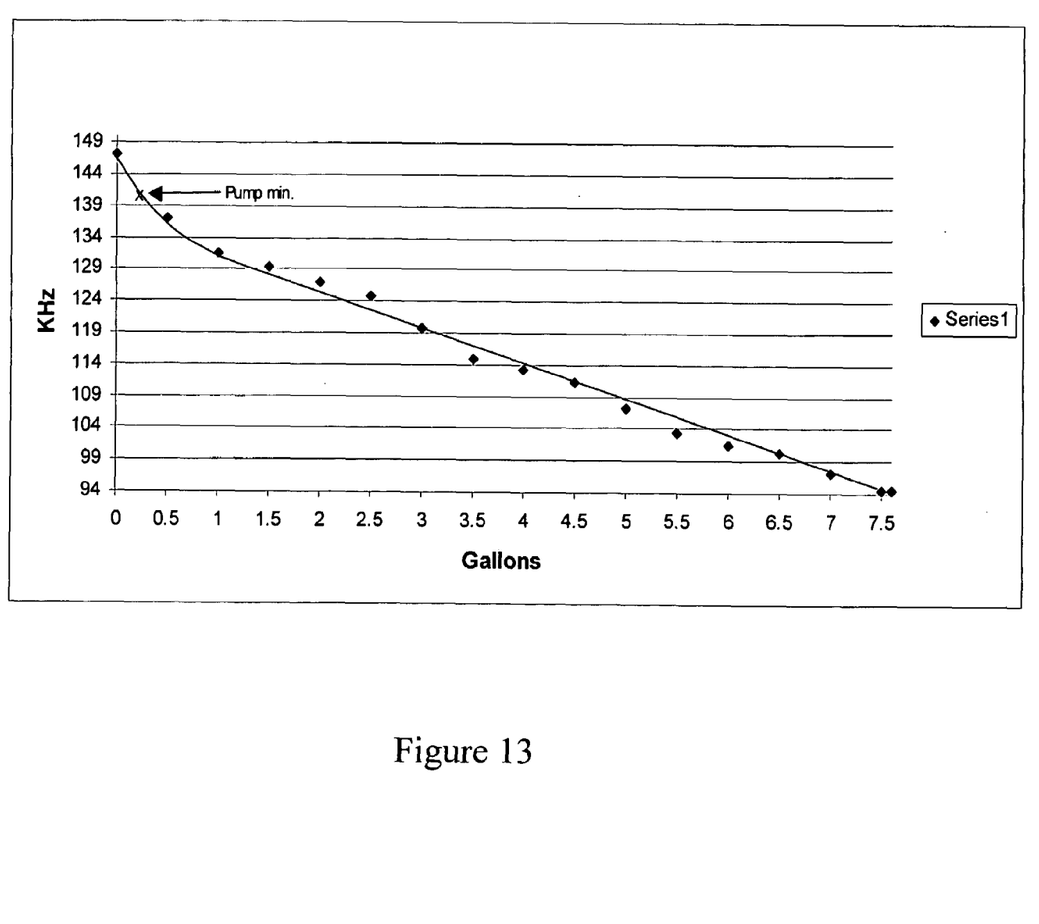
FIG. 13 shows an output frequency vs. input gallons chart derived from the electronics module output of a fluid level capacitive sensing element according to the present invention, while measuring the level of fluid in a vessel, the sensing element is configured according to FIG. 3, with spacing 6 greater than two times the thickness of a dielectric wall of the vessel to which it is mounted as in FIG. 4, the nonlinear output frequency vs. input gallons relationship having a regular error ripple above and below a theoretical straight line.

In the first preferred embodiment, according to FIG. 7, the level of the fluid contained within vessel 9, is indicated by the capacitance measured between the electrodes 1, 2. If the thickness of the tank wall 8, is relatively thin, such as 1 mm, the spacing between adjacent electrodes can be relatively small, such as 2 mm. This provides more sensitivity to the liquid, which means that a greater capacitance is measured than would be if the electrode spacing was greater. If the wall is thicker, for example 3 mm, then the field of the sensor must be larger in order to penetrate the wall. This requires greater electrode spacing, for example 6 mm. The loss of sensitivity due to wide spacing of electrodes can be recovered by increasing the number of electrodes, connected in parallel or series, used to make the measurement. This assumes that enough space is available for positioning of the additional electrodes. It is preferred that the ratio of electrode spacing 6, to the width of an individual electrode conductor 1, 2, must be relatively large, such as four or more. A preferred spacing is two times the thickness of dielectric wall 8. Other spacings may be used. A smaller spacing leads to an increase in capacitance measured between connections 4, 5, but also leads to a decrease in the dependency of the capacitance value on fluid level. A larger spacing decreases the capacitance, but increases the dependency of the capacitance on fluid level until the spacing approaches four times the thickness of dielectric wall, 8. Spacing greater than two times the thickness of the dielectric wall also leads to a periodic nonlinearity as shown in FIG. 13. Such greater spacing may be desirable, however, to minimize the effects of the dielectric material, at the expense of measurement nonlinerity.

When the vessel is empty, an empty capacitance is measured. When the vessel is full, a full scale capacitance is measured. The difference in capacitance between empty and full is the capacitance span. The objectives of an optimum sensing electrode design include maximizing the capacitance span and maximizing the measurement ratio, which is the capacitance span divided by the empty capacitance. It is also important to produce a linear change of capacitance from empty to full. Maximizing the capacitance span reduces the errors introduced by the approach of nearby objects. Maximizing the measurement ratio reduces the drift error component introduced by a given set of electronics.

If the electrode spacing is smaller than the optimum amount, a higher starting capacitance will be obtained for the same or a reduced capacitance span. If the electrode spacing is greater than maximum, a reduced capacitance span will be obtained.

In order to obtain the greatest capacitance span for a given electrode spacing, certain patterns can be used to increase the electrode area while maintaining a given electrode spacing. When electrodes are implemented as a set of parallel horizontal lines, the capacitance change will be non-linear, with a greater percentage change occurring in the vicinity of each electrode. To eliminate this non-linearity error, the electrodes should be inclined such that the end of one electrode is proximate to the beginning of the next, as shown in FIG. 3a.

Figure 8:
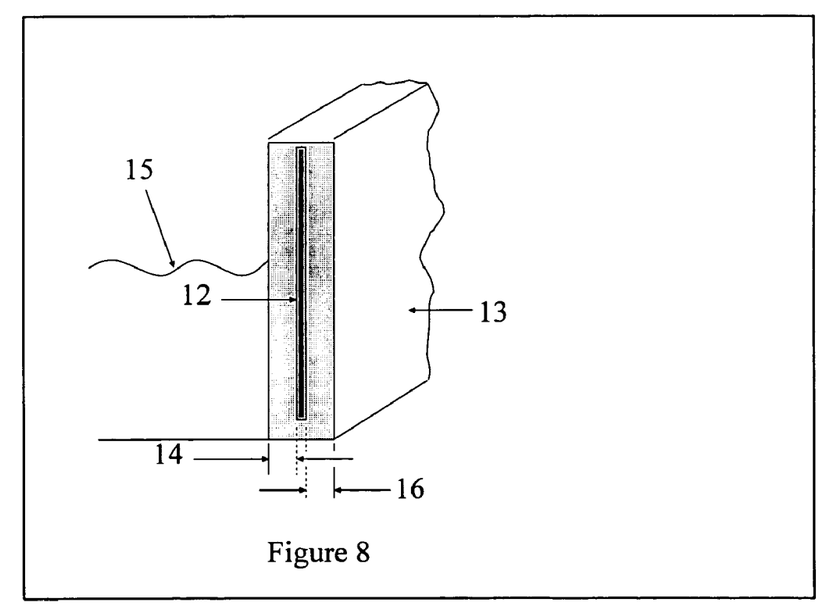
FIG. 8 shows a capacitive fluid level sensing element 12, which can be fabricated in any of the conductor patterns of the previous figures, or another capacitive sensing element conductor pattern, fully embedded within dielectric wall 13, with spacing 14 facing the measured liquid level, and spacing 16 facing the outside of the vessel or the inside of a device utilizing fluid level information, such as a bilge pump.
Figure 9:
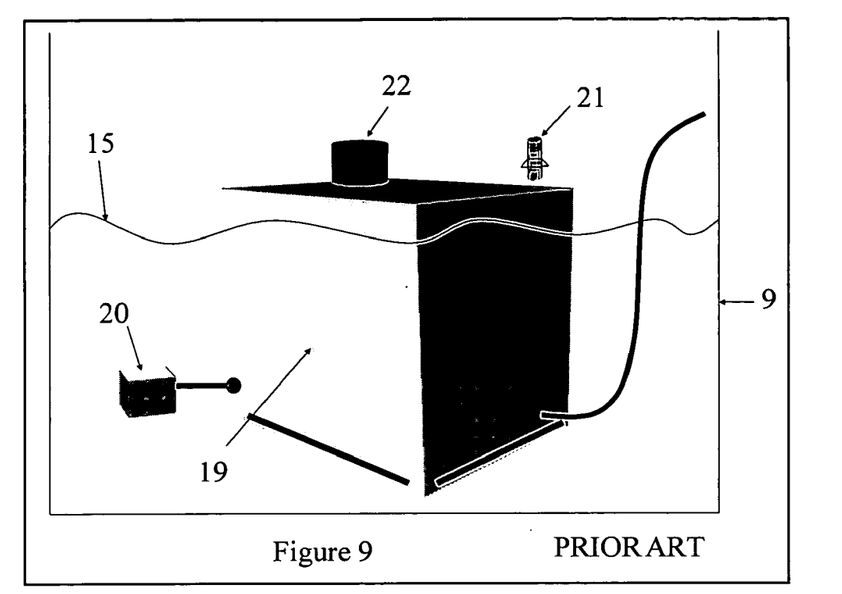
FIG. 9 shows a prior art method for operating a device utilizing fluid level information, such as a bilge pump 19, placed into a fluid having a level, 15, within vessel 9. Float switch 20, acts to switch on or off bilge pump 19, to eject fluid from vessel 9, through barbed fitting 21. Item 22 is the pump motor.
Figure 10:
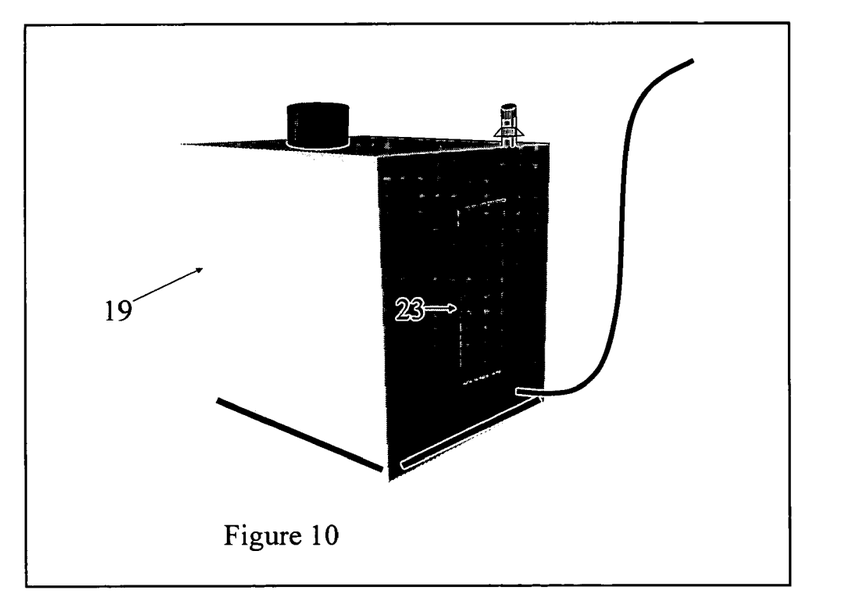
FIG. 10 shows a device 19, such as a bilge pump that utilizes fluid level information, the device not using a float switch.

A second preferred embodiment is shown in FIG. 8, as a capacitive fluid level sensor 12, embedded within a dielectric portion, 13, herein called the wall, of a device, 19, that utilizes fluid level information, such as a bilge pump. In this case, the fluid level 15, to be measured is located adjacent to the wall, with spacing 14. Spacing 15 is between the sensing element and the interior of the device. This second preferred embodiment of the present invention is also shown in FIG. 10, in which item 23 is the area in which the sensing element is embedded. This arrangement is contrary to the prior art method of operating such a device by means of a float switch as shown in FIG. 9.

Figure 11:
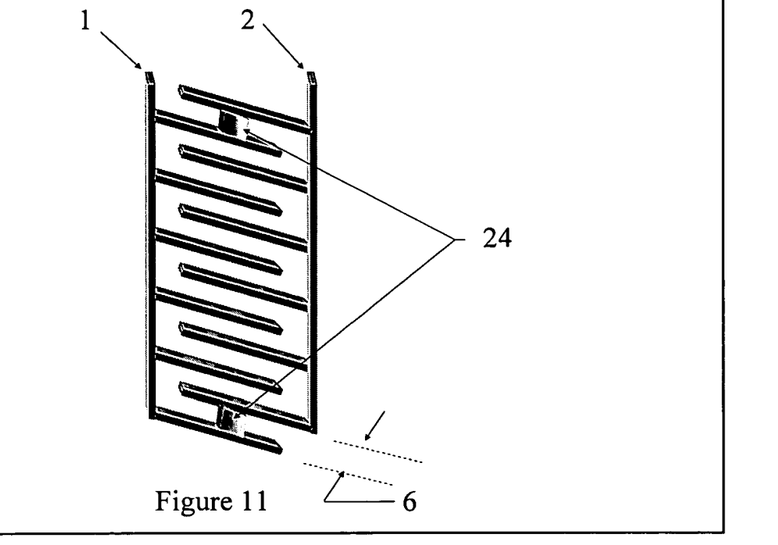
FIG. 11 shows a free standing sensing element, comprising conductors 1 and 2, with the conductors held in place at a spacing, 6, by dielectric support members 24.

Alternatively, in both the first and second preferred embodiments, the sensor electrodes 1 and 2 can be fabricated from a conductive material as shown in FIG. 11, and then embedded into a dielectric material, or with dielectric supports, 24, without first mounting the electrodes to a substrate. The electrode material can be a metal such as steel, or another electrically conductive material, such as carbon fiber. For example, the electrode pattern can be stamped from metal and insert molded into the wall of a vessel such as a holding tank, or into a device such as a bilge pump. Of course, other methods instead of stamping can be used for forming a conductive electrode structure, including such techniques as water jet, laser, machining, sintering, and other forming techniques. Also, instead of insert molding, other methods to imbed the electrodes into the non-conductive support structure can be used such as potting, laminating, thermal-forming and others.

In the case when the electrode pattern is formed as a strip, it may be adhesive-backed, and may be cut to length to fit to the individual application.

Figure 12:
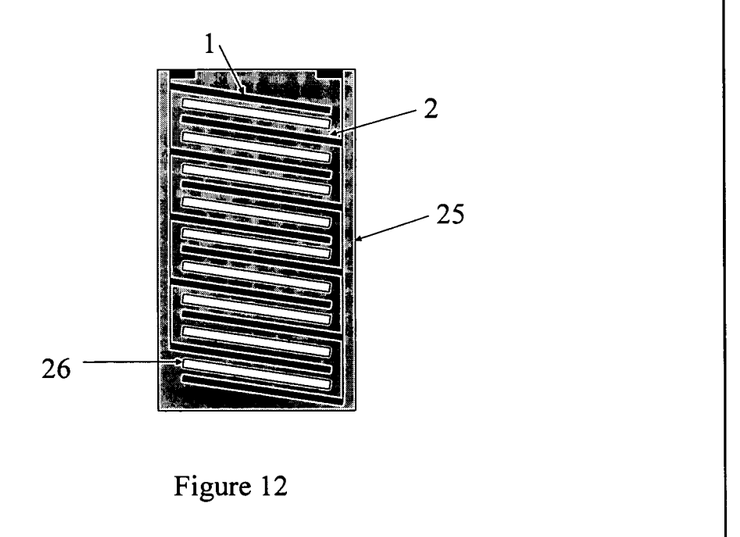
FIG. 12 shows a capacitive sensing element structure comprising interdigital comb conductors 1 and 2, embedded within dielectric material 25, with gaps (such as opening or depressions) 26 formed into the dielectric material 25.

A third embodiment of the present invention is shown in FIG. 12, and serves to improve fluid level measurement accuracy in cases where the fluid tends to form a coating on the dielectric material at the sensing element surface. Some fluids may tend to coat the surface of the dielectric material that separates the sensing element conductors from the measured fluid, thereby affecting the accuracy of fluid level measurement because some of the fluid remains adjacent to conductors 1 and 2 for a time after the fluid level has receded below that point. This effect can be reduced by introducing depressions or gaps, 26, in the dielectric material 25, that is between adjacent fingers of conductors 1 and 2.

Figure 14:
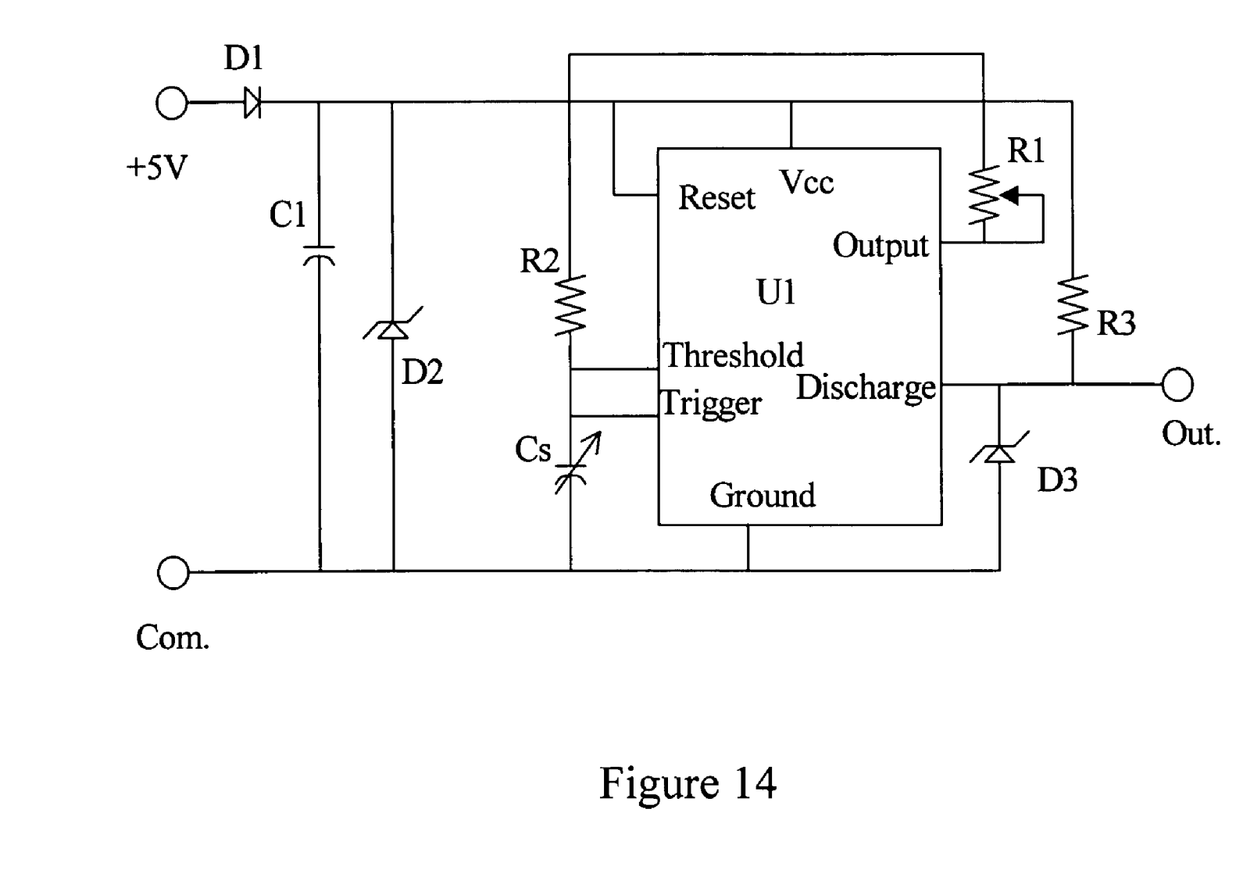
FIG. 14 is a typical circuit that can be used as the electronic circuit module with a capacitive sensing element according to the present invention. The output frequency changes in response to changes in the capacitance of the connected capacitive sensing element, Cs, and accordingly in response to changes in fluid level.

Any of the sensing elements fabricated according to the present invention can be used with standard capacitance measuring circuitry in order to measure a fluid level. Many such circuits are old in the art. A typical circuit is shown in FIG. 14. U1 is a standard 7555 type of timer integrated circuit. Cs is the measured capacitance. The output of this circuit is a frequency that changes with the amount of capacitance of Cs, but other circuits may produce other types of outputs, such as a time period, voltage level, or other analog or digital signals.

Figure 15:
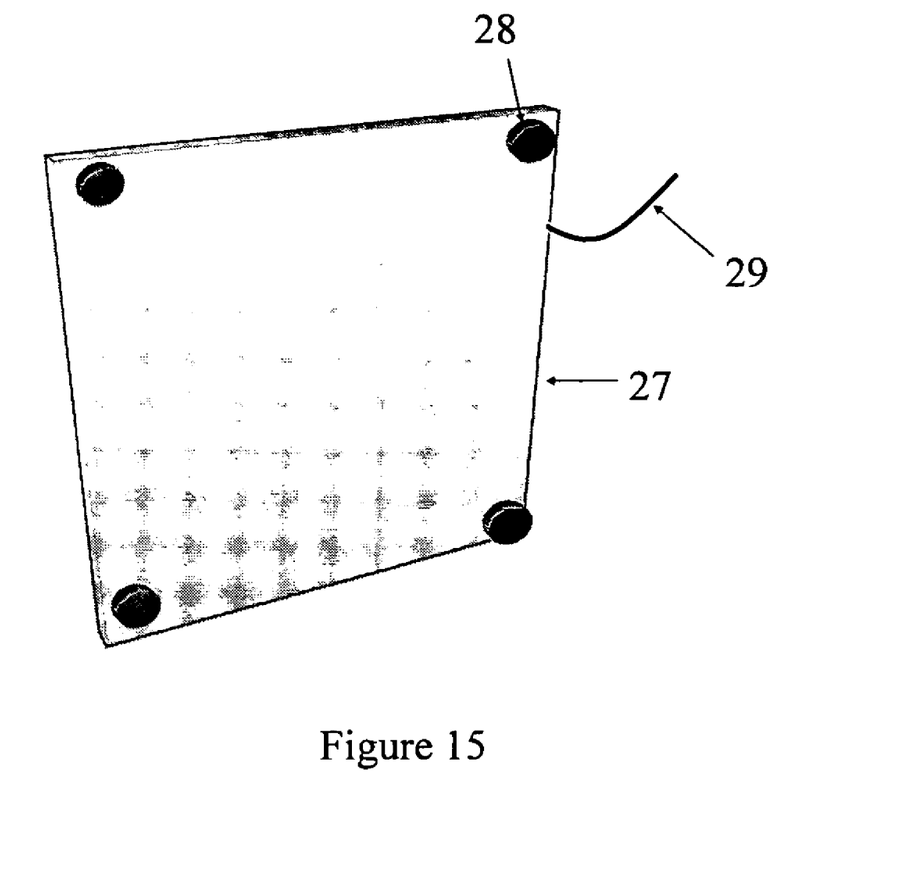
FIG. 15 shows a conductor, 27, that can be mounted adjacent to a capacitive liquid level sensing element that is constructed according to the present invention, such as the sensing element patterns shown in FIG. 3. The conductor used with spacers 28, for positioning it substantially parallel to the plane of the sensing element, the conductor is electrically connected to ground or to an electronic circuit module by suitable conductive or capacitive means, 29.

A guard or shield, as shown in the edge view of FIG. 5, is sometimes beneficial in order to reduce sensitivity of the sensing element to electrical disturbances on the side of the sensing element that is opposite the measured fluid. An alternative configuration to that of FIG. 5 is shown in FIG. 15, in which shield 27 is an electrical conductor, and is positioned by spacers 28, to maintain a spacing from the sensing element. Conductor 29 is used to make connection to ground or to the electronic circuit module. When used as a guard instead of a grounded shield, the conductor, 27, may be driven at the same potential as an electrode of the sensing element. Guard driving circuits are not described here, as they are old in the art.

I claim:

1. A capacitive sensor for sensing the level of a fluid in a vessel, the sensor positioned proximate the vessel and separated from the fluid by a dielectric wall of the vessel, the sensor comprising:
   at least two coplanar electrical conductors attached to a substrate and electrically insulated from one another, the conductors separated from one another by spacing, the spacing equal to at least two times the thickness of the dielectric wall, the conductors forming a fringing field capacitance, the value of the capacitance changing in response to changes in the level of the fluid, at least two of the conductors configured as interdigital combs, zigzag lines, sinusoidal lines, or meander lines;
   at least two of the conductors driven by an alternating current electrical signal, the value of the fringing field capacitance indicative of the level of the fluid.

2. The sensor of claim 1, wherein at least a portion of the substrate is removed from the area of the spacing, forming a depression, opening or gap in the surface of the substrate that faces the fluid.

3. The sensor of claim 1, wherein the conductors are thin metallic structures mounted onto a thin dielectric substrate, the sensor being flexible to conform to an irregular dielectric surface of the vessel.

4. The sensor of claim 1, wherein the sensor has first and second faces, the first face of the sensor positioned proximate a dielectric wall of the vessel, the second face positioned proximate a front surface of a spacer:
   the spacer comprising a bulk dielectric material having a relative permitivity and a thickness, the bulk dielectric material having a relative permitivity of less than 2, and a thickness of at least two times the thickness of the dielectric wall.

5. The sensor of claim 4, wherein a back surface of the spacer is attached to an electrically conductive material that is connected to an electronic circuit or to ground.

6. A capacitive sensor for sensing a level of a fluid in a vessel, a dielectric wall of the vessel having an inner surface and an outer surface, the inner surface facing the fluid, the sensor frilly embedded within the dielectric wall of the vessel, the sensor comprising:
   at least two coplanar electrical conductors electrically insulated from one another, the conductors each having a width, the conductors together having an average width, the conductors separated from one another by spacing, the conductors together having an average spacing, the average spacing being at least four times the average width of the conductors.

7. The sensor of claim 1, wherein the conductors each have a width, at least two of the conductors that form the fringing field capacitance having an average width and an average spacing, the average width being equal to, or less than, one fourth of the average spacing.

8. The sensor of claim 7, wherein at least two of the conductors are configured as interdigital combs, the combs having fingers, the fingers inclined with a slant from horizontal, the value of the fringing field capacitance changing in a continuous fashion in response to changes in the level of the fluid.

* * * * *